Dec. 10, 1940.   S. M. HUMPHREY   2,224,821
WELDING APPARATUS
Filed April 7, 1938   4 Sheets-Sheet 1

Inventor
STANLEY M. HUMPHREY.
By Francis J. Klempay
Attorney

Dec. 10, 1940.    S. M. HUMPHREY    2,224,821
WELDING APPARATUS
Filed April 7, 1938    4 Sheets-Sheet 2

Inventor
STANLEY M. HUMPHREY.

By Francis J. Klempay.
Attorney

Dec. 10, 1940.     S. M. HUMPHREY     2,224,821
WELDING APPARATUS
Filed April 7, 1938     4 Sheets-Sheet 3

Inventor
STANLEY M. HUMPHREY.
By Francis J. Klempay
Attorney

Dec. 10, 1940.     S. M. HUMPHREY     2,224,821
WELDING APPARATUS
Filed April 7, 1938     4 Sheets-Sheet 4
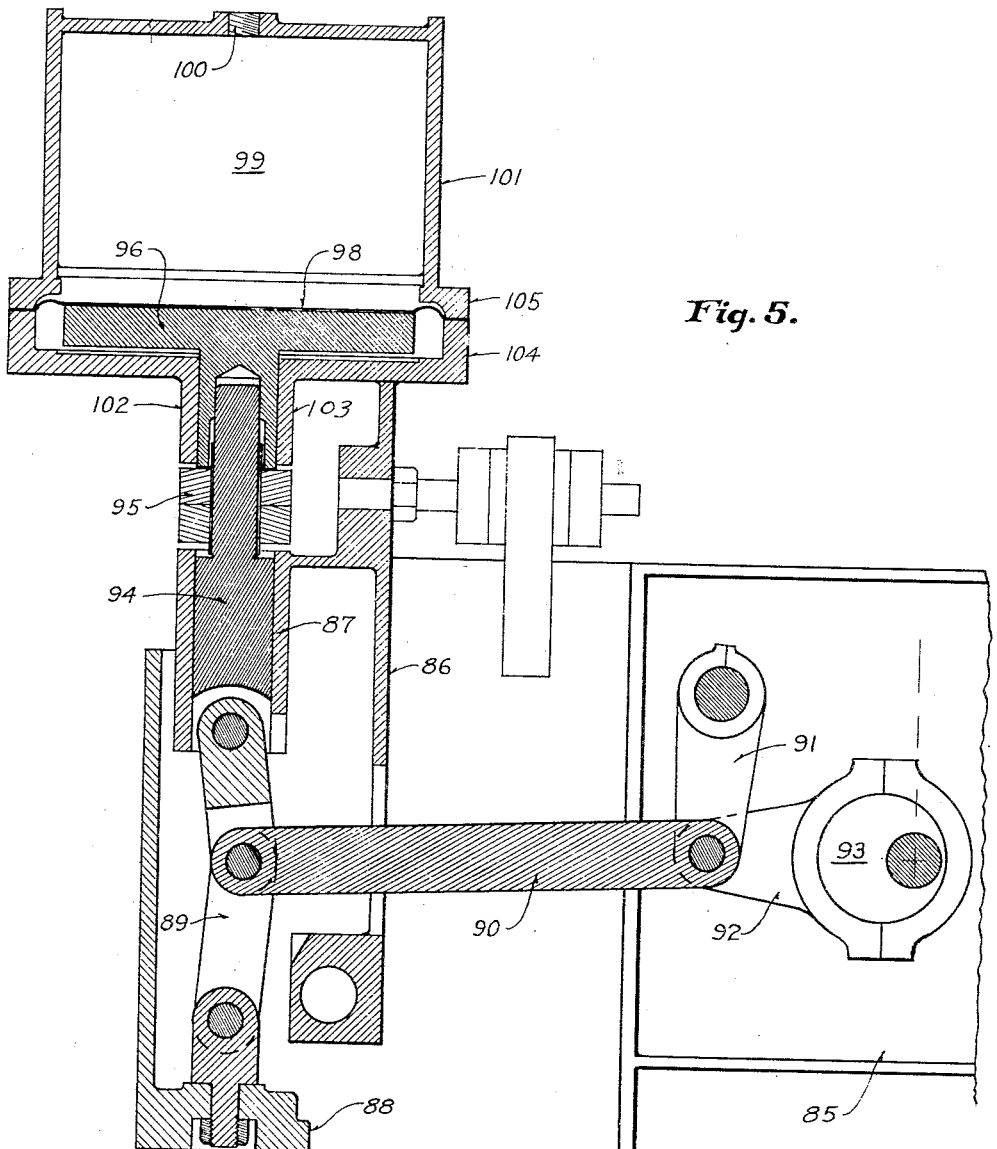
Fig. 5.
Inventor
STANLEY M. HUMPHREY.
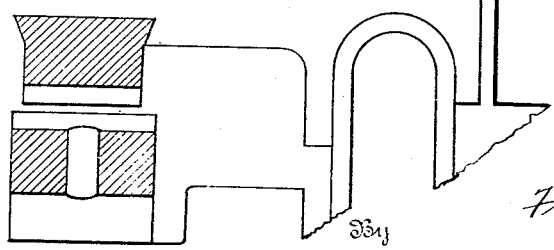
Attorney Patented Dec. 10, 1940

2,224,821

UNITED STATES PATENT OFFICE 2,224,821

WELDING APPARATUS

Stanley M. Humphrey, Warren, Ohio, assignor to Taylor-Winfield Corporation, Warren, Ohio, a corporation of Ohio Application April 7, 1938, Serial No. 200,584

3 Claims. (Cl. 219—4)

This invention relates to the art of welding and more particularly to an improved method and apparatus for the actuation of the forging pressure applying element of the welding apparatus, which element, in the case of electric welders, also forms a part of the welding current conducting path.

Heretofore, various means have been proposed and used for the application of the forging pressure to the pieces being welded but after extended experimental study and analysis of the welding process I have found that each of the known means is deficient in certain respects and that actuation means of different and more favorable characteristics must be provided if the density and uniformity of the welds are to be improved. Accordingly, the principal object of this invention is to provide an improved method and apparatus for the actuation of the welding electrodes or other forging pressure applying means.

In the construction of welding apparatus it is common to provide, in addition to the primary electrode moving means, a secondary pressure loading means the purpose of which is to maintain a constant pressure on the movable electrode in order that this electrode will move relatively to the fixed electrode in opposition to the physical resistance offered by the metal being welded upon softening of the metal by the passage of current between the electrodes and through the metal. It is well understood in the art that the pieces of metal being welded together must be forced into intimate surface contact as the proper welding temperature is reached and inasmuch as the welding cycle, for stock of moderate thickness at least, is accomplished in a very short period of time, it is desirable that the working electrode move with the least possible delay. I have observed that by the use of methods now commonly employed the working electrode fails to move until after the optimum time for such movement has passed, that is, the electrode does not move for a considerable interval of time after the metal reaches the desired welding temperature. During this interval, gases occluded in the structure of the metal are liberated and expanded causing disruption of the surfaces to be welded and as the metal begins to cool before the forging movement takes place an inferior weld is produced. I seek to overcome the above mentioned objectionable characteristics by substantially reducing the friction and inertia of the movable electrode assembly and particularly that portion of the assembly which applies the welding pressure irrespective of whether or not the welding pressure applying means is separate from the principal electrode moving means. This is accomplished, for example, by providing a freely floating air spring or air loaded diaphragm as the operative motor for the welding cycle movement of the working electrode and since such means are without starting friction and have little inertia, a constant pressure will in fact be maintained on the work and the working electrode will move promptly upon the softening of the metal. The forging will be accomplished before the meeting surfaces are damaged by the liberation and expansion of occluded gases. It has also been found that some reduction in the quantity of current passed may be effected.

The elimination of the starting friction in the pressure loading device eliminates the tendency of the movable electrode assembly to surge during the welding cycle thus reducing the maximum stress imposed on the work and consequently lessening the marring of the same.

These and other objects and advantages of the invention will become apparent from a consideration of the drawings and the following detailed specification.

In the drawings:

Figure 5 is a fragmentary view, partly in section, of a modified machine utilizing the principles of this invention.

Figure 2:
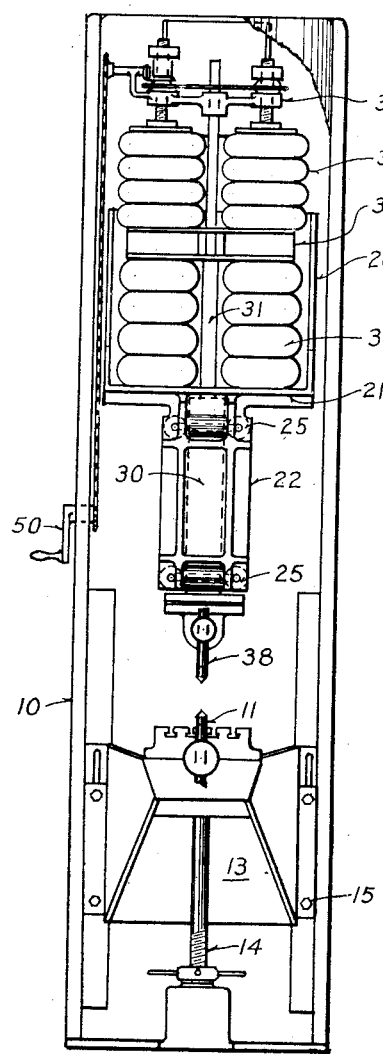
Figure 2 is a front view of the machine of Figure 1.
Figure 1:
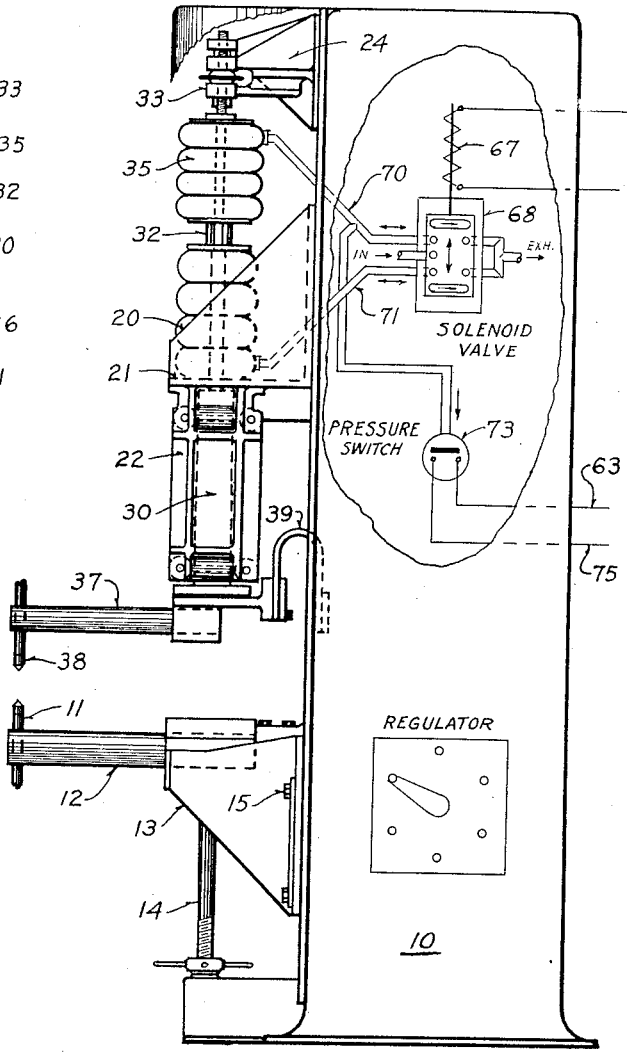
Figure 1 is a side view of a welding machine constructed in accordance with my invention.
Figure 3:
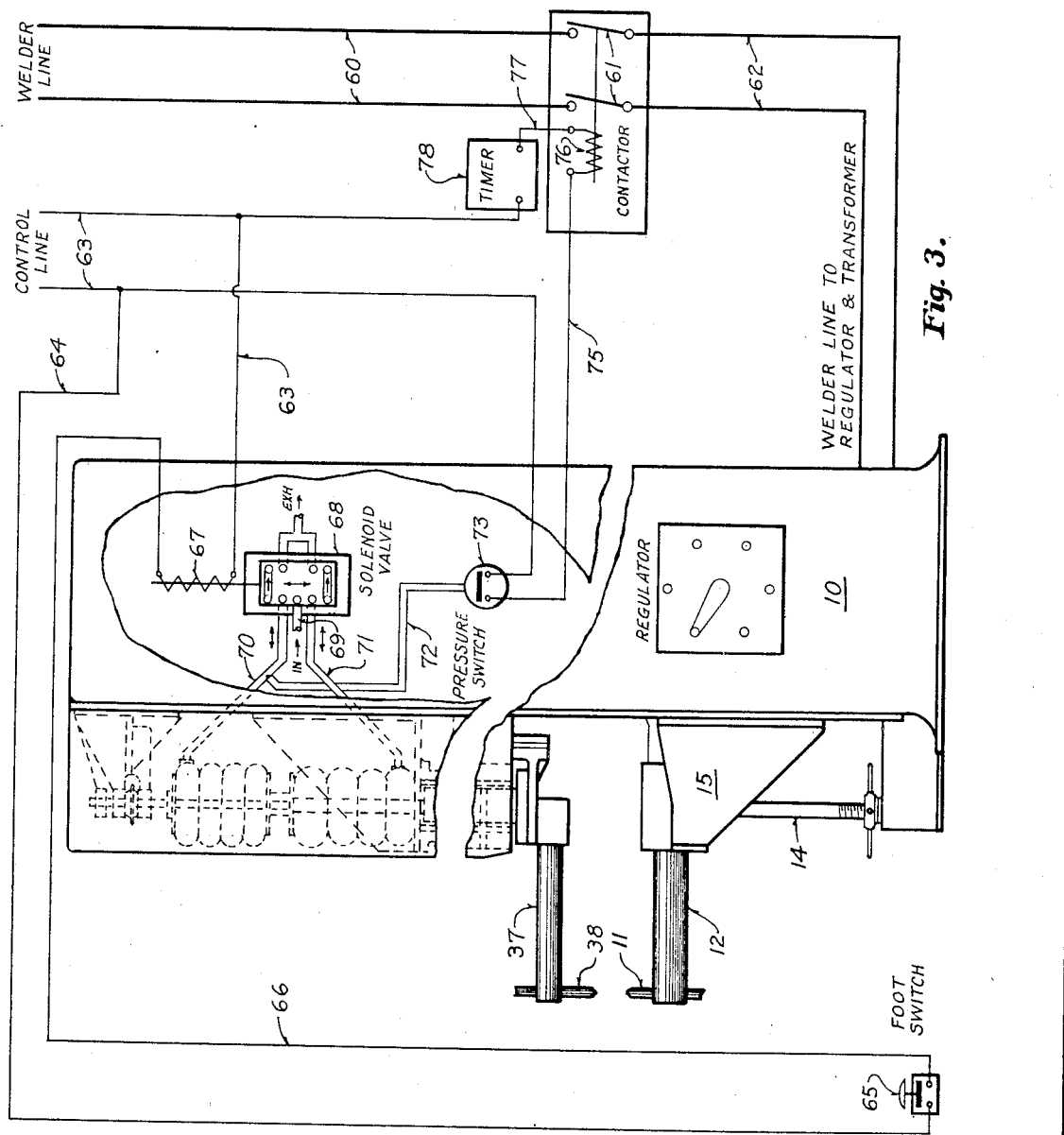
Figure 3 shows the control circuit for the machine of Figure 1.
Figure 4:
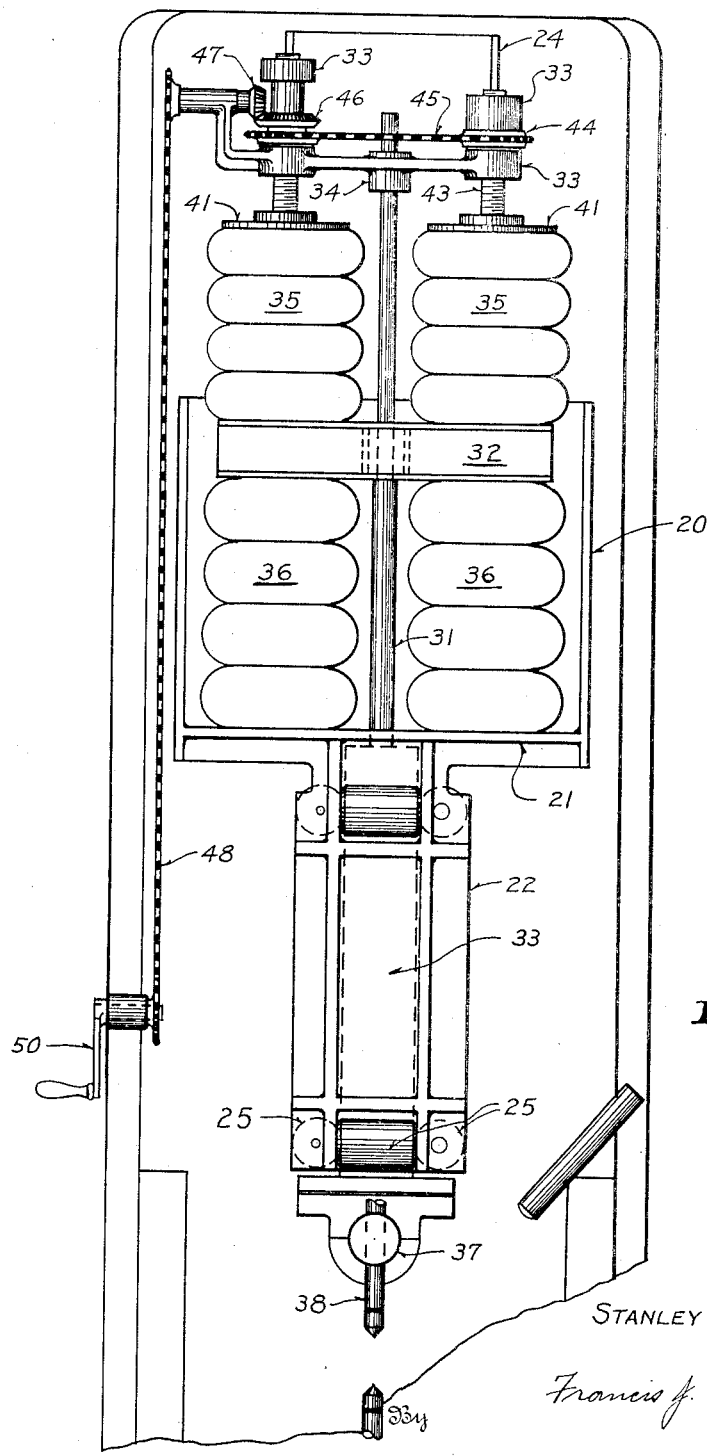
Figure 4 is an enlarged view of the air operated motor for moving the electrode.

Referring to the apparatus illustrated in Figures 1 to 4, inclusive, the invention is shown as embodied in a spot welder having a suitable frame 10, a normally fixed electrode 11 and a movable or working electrode 38. Electrode 11 is carried by an arm 12 rigidly secured to the anvil 13, the vertical position of which may be minutely varied by the jack 14. Screws 15 are adapted to lock anvil 13 in selected position.

A pair of vertically spaced brackets 20 and 24 are welded or otherwise suitably secured to the front face of the frame or casing 10 and the lower bracket 20 is provided with a horizontal shelf 21 for the support of the air operated motor to be hereinafter fully described. Depending from the shelf 21 is the guide 22 which includes an upper and lower group of horizontally disposed rollers 25, the rollers of each group being arranged in a square to accommodate therein a plunger 30 which at its lower end is connected with the movable electrode supporting arm 37. Current is supplied to arm 37 and electrode 38 through flexible secondary lead 39. Plunger 30 is provided with an upwardly directed extension 31 which is guided at its upper end by being slidably received within the bored collar 34 of the upper bracket 24 and has rigidly secured thereto intermediate its ends a transverse member 32 which divides the upper and lower bellows 35 and 36, respectively, of the air operated motor and against which the ends of the bellows abut. Bellows 35 and 36, commonly termed "air springs," are made of fabric and rubber or rubberized fabric as is well known in the art and consist of a number of interconnected sections forming a unit closed at both ends, which unit will expand upon inflation and form a readily yieldable cushion if confined.

A pair of bellows 36 are positioned between the shelf 21 and the transverse member 32, one on each side of the rod 31, and a second pair of bellows 35 are positioned between the member 32 and adjustable abutments carried on the upper bracket 24. For this purpose, bracket 24 is provided with a pair of transversely spaced forked ends 33 each of which is vertically bored to receive a screw threaded member 43 which engages a disk 41 abutting the upper end of the adjacent bellows unit. Positioned within each fork of the bracket 24 are the rotatable members 44 which are provided with a threaded bore to screw threadedly engage the member 43 and which have sprocket teeth on their outer periphery for engagement with a closed interconnecting chain 45 whereby both abutments 41 may be moved up and down in unison. One of the rotatable members 44 is provided with a bevel gear 46 which is engaged by a second bevel gear 47 suitably driven by an exteriorly positioned and easily accessible crank 50 as by the closed chain 48, for example.

Compressed air is supplied to the bellows units 35 and 36 through suitable means as the tubes 70 and 71, the tube 70 supplying air to the upper two units and the tube 71 serving the lower two units. The flow of air is controlled by a multiple valve 68 operated by the solenoid 67 and upon energization of the solenoid, air from a suitable source of supply enters valve 68 through conduit 69 and passes into the upper units through conduit 70. At the same time any air entrapped in the lower bellows will be exhausted through conduit 71. When solenoid 67 is deenergized upon completion of the welding cycle, valve 68 is reversed and air is supplied to the lower bellows and exhausted from the upper bellows to raise the movable electrode 38. Solenoid 67 is controlled by switch 65 which is depressed to initiate the welding cycle and the circuit is traced from line 63, solenoid 67, conductor 64 and line 63.

Upon actuation of switch 65 pressure will build up in the upper bellows and when a predetermined pressure is attained pressure responsive switch 73, connected with the upper bellows through conduit 72, will close and establish the circuit-line 63, switch 73, conductor 75, solenoid 76, timer 78 and line 63. Switch 61 will close, connecting the welding transformer primary leads 62 with the line 60 and current will flow until the timer 78 breaks the energizing circuit for solenoid 76.

Motion is transmitted from the motor 35—36 to the electrode 38 through the plunger 30, which is anti-frictionally guided by the rollers 25, extension 31 and member 32. Upon admission of air under pressure to the upper bellows 35 these bellows are caused to expand and since their upper ends are fixed, the members 32, 31 and 30 will be moved downwardly. Likewise, expansion of the lower bellows 36 will move member 32 upwardly since the lower ends of these bellows are fixed. At the start of the welding cycle electrode 38 will be moved to pressure contact with the stock and as a constant supply of air under pressure is maintained in the upper bellows the electrode will move relatively to said fixed member immediately upon softening of the metal of the stock and such movement takes place without appreciable time lag as the bellows motor is substantially without starting friction and has little inertia. The welding pressure is applied nearer the optimum time for such application during the welding cycle and a better weld is accomplished. Due to the balanced arrangement and slight inertia of the motor the movement of the electrode is even and its extent is in proportion to the decrease in physical resistance encountered and thus any jerking or surging movement is eliminated. The result is that less metal of the stock is displaced and less marring is done on the surface of the stock.

Figure 5 illustrates a different manner of applying the principles of this invention and in this modification primary movement of the movable electrode is accomplished by means of a toggle 89 actuated by a link 90 which in turn is oscillated by the follower 92 engaging the eccentric 93. As shown, link 90 is pivotally attached to both the toggle and the follower so that the entire toggle assembly will be free to move vertically. A depending pivotally supported link 91 pivotally connects with link 90 and follower 92 and maintains the horizontal position of the link. The parts are suitably supported on the frame or housing 85 to which is also secured the member 86 provided with a vertically extending guide 87. A disk-like member 102 having an upwardly extending annular flange 104 and a downwardly extending guide 103 is positioned on and secured to member 86 in such manner that guides 87 and 103 are aligned. Toggle 89 is connected at its lower end with any means, as 88, which supports or actuates the movable electrode and is connected at its upper end with a member 94 slidably mounted within guide 87. A stop member 95 is adjustably mounted on the member 94 and is adapted to limit the movement of member 94 and to be engaged by the depending portion in guide 103 of the plate 96.

A casing 101 having a downwardly extending annular flange 105 to fit over flange 104 is secured in any suitable manner to member 102 and, as shown, a flexible diaphragm 98 is clamped between the flanges 104 and 105. Diaphragm 98 overlies the plate 96 and is adapted to move the same and the toggle assembly downwardly by the air pressure above during the welding cycle. In operation, a constant supply of air under pressure is maintained in the space 99, the air entering through port 100 and as the eccentric straightens out the toggle the welding die engages the work and the plate 96 and diaphragm 98 are moved upwardly in the air chamber. When the toggle is substantially straight, welding current is turned on and as the metal softens, the air pressure moves the die or electrode relatively to said fixed member to effect the weld. Inasmuch as the resistance to movement of the die or electrode is opposed solely by the air under pressure within the chamber 99 and since the chamber is of large volume the welding die or electrode will move downwardly immediately upon the softening of the metal. The quick movement results from the low friction and inertia of the operating motor.

The above specifically described embodiments of my invention should be considered only as illustrative as obviously many changes may be made in the structural elements of the apparatus without departing from the spirit or scope of the invention. For example, the control system shown is but one of many which may be used. The pressure responsive switch may be replaced by a time delay switch as well understood in the art and other elements and combinations of the apparatus may be varied to suit individual conditions.

Having thus fully described my invention what I claim is:

1. An electric welding machine comprising a normally fixed electrode, a normally movable electrode, means for moving and applying welding pressure through said movable electrode enabling a rapid forging movement of said movable electrode to be accomplished comprising a fluid pressure distensible element mechanically connected with said movable electrode, said element being constructed of flexible non-metallic material and possessing relatively little mass in its movable portion whereby the inertia of said movable portion is kept to a minimum and friction incident to the starting of movement of said portion is eliminated, whereby the contact pressure between said movable electrode and the material between said electrode is maintained substantially constant and delayed and surging movement of said movable electrode is avoided.

2. An electric welding machine comprising a pair of welding electrodes to engage the material being welded, one of said electrodes being normally fixed and the other normally movable toward and away from the fixed electrode and adapted to apply welding pressure to the material being welded, a bellows constructed of non-metallic flexible material adapted to move said movable electrode toward said fixed electrode, the normally movable portion of said bellows having relatively little mass whereby the inertia of said moving portion is reduced to a minimum and all starting friction eliminated, thereby maintaining constant the contact pressure between said movable electrode and said material and eliminating delayed and surging movement of said movable electrode.

3. An electric welding machine comprising a normally fixed electrode, a movable electrode adapted to move toward and away from said fixed electrode, a carrier supporting said movable electrode, means to antifrictionally guide said carrier, means to move said carrier comprising a fixed abutment, an adjustable abutment movable toward and away from said fixed abutment, a follower positioned between said fixed abutment and said movable abutment and mechanically connected with said carrier, a bellows constructed of non-metallic flexible material positioned between said fixed abutment and said follower, a second similar bellows positioned between said follower and said movable abutment, and means to alternately supply fluid under pressure to each of said bellows.

STANLEY M. HUMPHREY.